United States Patent

[11] 3,582,921

[72] Inventor Charles R. Krieger
 1639 East Kingsley Ave., Pomona, Calif. 91767
[21] Appl. No. 750,541
[22] Filed Aug. 6, 1968
[45] Patented June 1, 1971

[54] TEMPERATURE TRANSDUCER AND TELEMETRY SYSTEM
 14 Claims, 7 Drawing Figs.

[52] U.S. Cl. ..................................................... 340/182, 340/228, 340/206
[51] Int. Cl. ..................................................... G08c 15/06, G08c 19/18
[50] Field of Search .......................................... 340/177, 152; 340/182, 181, 228, 206, 177 (R)

[56] References Cited
 UNITED STATES PATENTS

| | | | |
|---|---|---|---|
| 3,475,742 | 10/1969 | Whitney et al. | 340/206X |
| 2,468,703 | 4/1949 | Hammel | 340/177 |
| 2,696,604 | 12/1954 | Markow et al. | 340/181 |
| 3,034,100 | 5/1962 | Bripner | 340/182X |
| 3,181,365 | 5/1965 | Maninger | 340/228X |
| 3,438,489 | 4/1969 | Cambornac et al. | 340/152X |

Primary Examiner—Stanley M. Urynowicz, Jr.
Attorney—Naylor & Neal

ABSTRACT: A temperature transducer having a small battery powered oscillator circuit packaged in a portable housing with a relatively slender probe projecting from the housing for insertion into food products or the like. A temperature responsive element is mounted at the tip of the probe and is coupled to a modulation switching circuit inside the housing for periodically activating the oscillator for a time duration which is proportional to the temperature of the temperature responsive element.

A plurality of such transducers are used in the telemetry system, each having a different frequency of oscillation, and each being inserted into a food product to be processed, e.g. into a ham to be smoke. The output signal of the individual transducers are picked up by a multichannel receiver outside the smokehouse, and the time duration modulation signals are translated into analog signal levels by a digital-to-analog converter. These analog signal levers are analyzed in an output circuit to produce output signals for controlling various functions, such as, the temperature of the smokehouse, the sounding of an alarm if any of the hams exceed a predetermined inner temperature, and the indicating of the inner temperature of any given ham without opening the smokehouse or interrupting the smoking process.

INVENTOR.
CHARLES R. KRIEGER
BY
Naylor & Neal
ATTORNEYS

INVENTOR.
CHARLES R. KRIEGER
BY
Naylor & Neal
ATTORNEYS

TEMPERATURE TRANSDUCER AND TELEMETRY SYSTEM

BACKGROUND OF THE INVENTION

This invention relates to a temperature transducer and telemetry system for use in processing food products or the like, e.g. in the smoking of meat. Temperature transducers and telemetry systems per se have been known in the art for many years, as disclosed, for example, in U.S. Pat. No. 2,974,314, which was issued to A. J. Bennett et al. on Mar. 7, 1961 for "Electrical Circuits for use with Temperature Responsive Devices," and U.S. Pat. No. 2,992,120, which was issued to R. H. Elsken on July 11, 1961 for "Telemetering System." These prior art transducers and telemetry systems, however, have serious disadvantages when applied to a process such as the smoking of meat, and the object of this invention is to provide an improved transducer and telemetry system which is particularly adapted to meat smoking and similar processes.

In meat smoking, it is necessary to have a plurality of small, portable, self-powered transducers which can be easily inserted into each piece of meat to monitor its internal temperature during the smoking process. The prior art transducers, however, are too large for this application, and would interfere with the handling of the meat because of their size. Also, in mass production operations, it is necessary to have an extremely rugged transducer to avoid damage during the meat handling process, and the prior art transducers also have the disadvantage of being too delicate to withstand the hard knocks that are inevitable in mass production meat handling. In addition, the prior art transducers are relatively expensive, which has an obvious drawback in large scale operations which require a separate transducer for each piece of meat to be processed. Accordingly, one object of this invention is to provide a temperature transducer which is smaller, less expensive, and more durable than those heretofore known in the art. Another object of this invention is to provide a transducer which can be easily inserted into a piece of meat or a similar food product to monitor the internal temperature of the food product without interfering with the handling thereof.

Meat smoking also involves several problems for which there is no solution in the prior art telemetry systems. For example, the proper rate of heating for a smokehouse is dependent on the internal temperature of all of the pieces of meat therein. And, since every piece of meat differs in size and composition, they will all reach their final temperature at different times and change their temperatures at different rates under the same environmental conditions. Also, since heat rises, the upper portion of a smokehouse is usually hotter than the lower portion, so that when the meat in the upper portion of the smokehouse reaches its final temperature, it may be necessary to exhaust heat from the upper portion of the smokehouse while still admitting heat to the lower part of the smokehouse to maintain uniform conditions throughout the smokehouse. Furthermore, if any of the pieces of meat exceed a predetermined upper temperature limit, it is desirable to actuate an external alarm which identifies the location of the overheated piece, so that it can be quickly removed from the smokehouse with a minimum of disturbance. None of these functions are provided in the prior art telemetry systems, and it is a further object of this invention to provide a telemetry system which will perform all of the above-noted functions plus the additional function of producing a visual indication of the internal temperature of any selected piece of meat at any given time.

SUMMARY OF THE INVENTION

To reduce the size and cost of the temperature transducer, and to make it possible to package the transducer in a small, rugged package, this invention utilizes pulse width modulation instead of continuous frequency modulation as used in the prior art transducers. The transducer of this invention comprises a housing member, a relatively slender probe attached to the housing member and projecting therefrom, a temperature-responsive element attached to the probe, an oscillator circuit within the housing member, a battery within the housing member for activating the oscillator circuit, and a modulator switching circuit for periodically activating the oscillator circuit for a time period which is proportional to the temperature of the temperature-responsive element. The modulator switching circuit is preferably a multivibrator, and an electrical connector is preferably attached to the housing member for receiving electrical power input to recharge the battery, along with a switch for automatically deactivating the oscillator and modulator switching circuits when the battery is being recharged.

The telemetry system comprises a plurality of such transducers, a receiver circuit for receiving the output signals of the transducers, and an output circuit coupled to the receiver circuit for producing indicator and control signals as a predetermined function of the temperature of the temperature-responsive elements in the transducers. The output circuit preferable includes a digital-to-analog converter for converting the time duration signals from the transducers into analog signal levels and a meter for indicating the numerical value of any selected analog signal to provide a visual indication of the temperature of the corresponding temperature-responsive element. The output circuit also preferably contains a comparison circuit for comparing the analog signal levels to predetermined signal levels and for producing indicator and alarm signals as a function of the difference between the analog signal levels and the predetermined signal levels. Each of the transducers preferably transmits a different frequency, and the receiver preferably contains a multiple channel input for simultaneously receiving the output signals of all of the oscillators on different channels.

DESCRIPTION OF THE INVENTION

Figure 2:
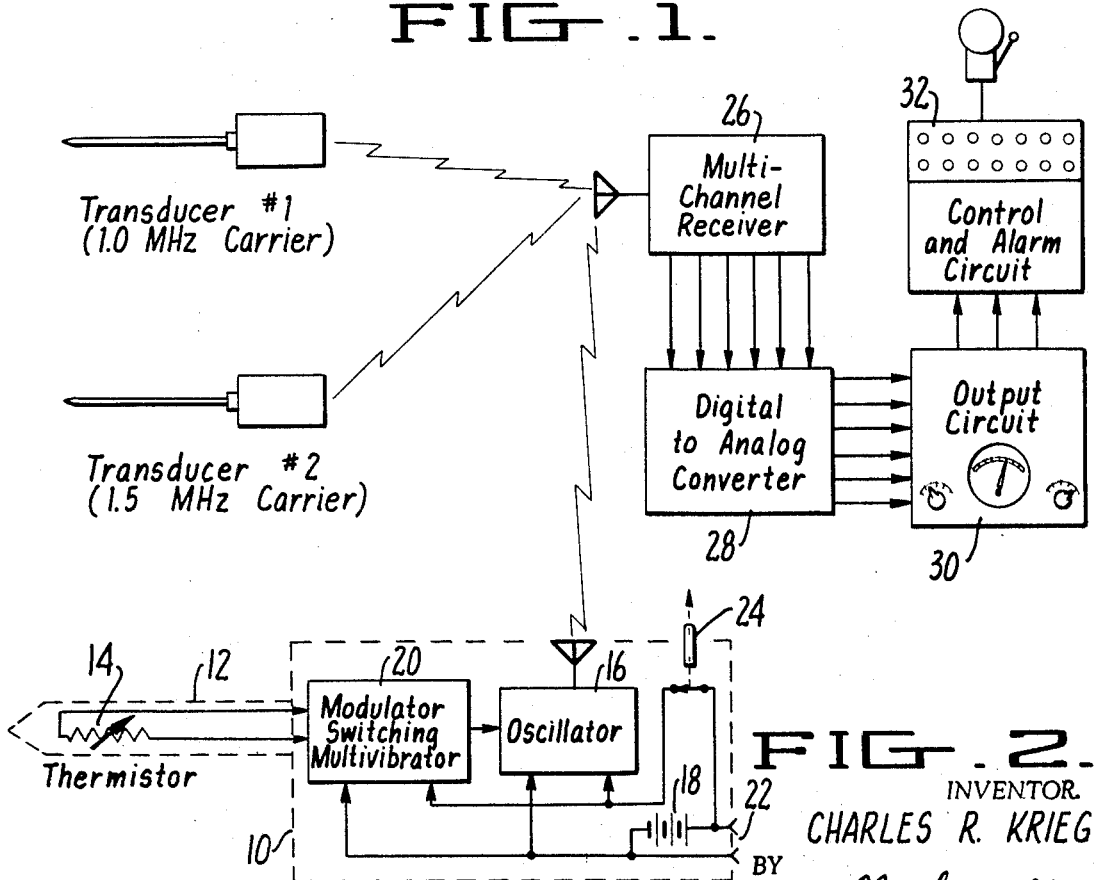
FIG. 2 is a block diagram of one illustrative transducer circuit and telemetry system of this invention.
Figure 3:
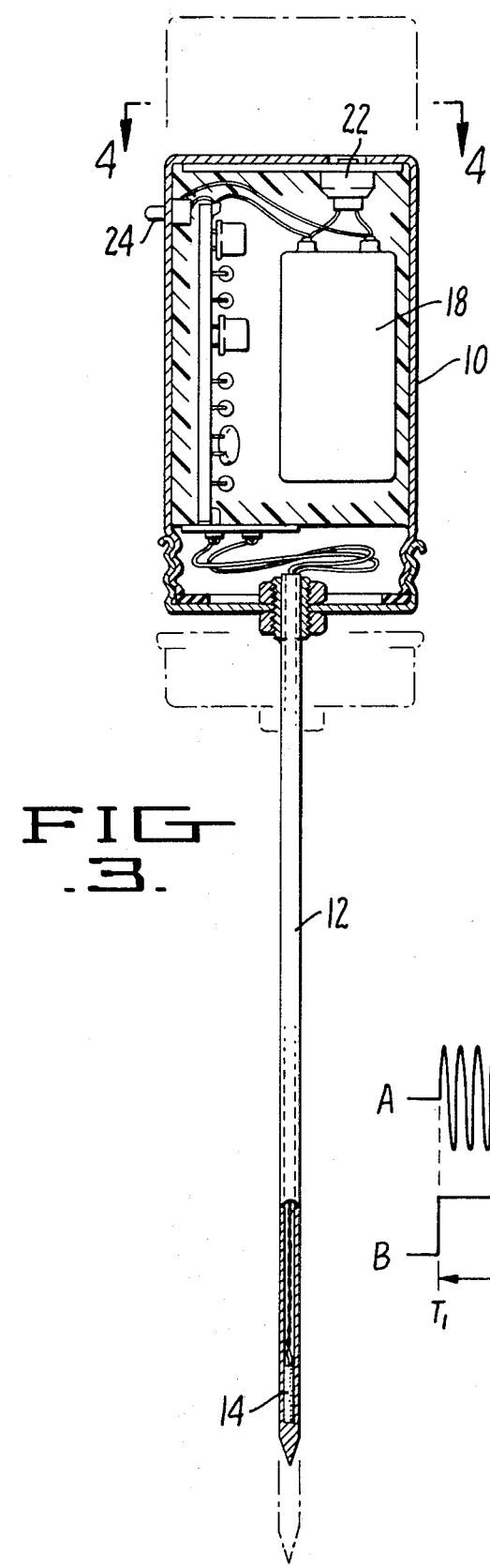
FIG. 3 is a cross-sectional view of one illustrative transducer housing and probe of this invention.

Referring to FIGS. 2 and 3, the preferred temperature transducer of this invention includes a housing member 10, a temperature-responsive element 14 mounted within the tip of probe 12, and an oscillator circuit 16, battery 18, and modulator switching multivibrator 20 all mounted within housing 10. An electrical connector 22 is mounted on one end of housing 10 for recharging battery 18, and a normally closed pressure actuated switch 24 is mounted on the side of housing 10 for automatically deactivating oscillator 16 and multivibrator 20 when battery 18 is being recharged. Switch 24 is automatically opened when housing 10 is inserted into a storage and recharging receptacle which will be described later.

Figure 6:
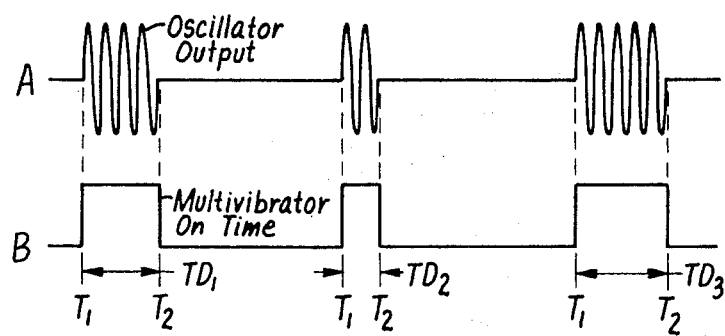
FIG. 6 is a set of wave forms illustrating the operation of the transducer of this invention.

The operation of this transducer circuit is illustrated by the wave forms in FIG. 6. Oscillator 16 is cut off during one state of multivibrator 20 and transmits a uniform carrier wave during the other state of multivibrator 20. Many suitable prior art coupling methods are known for effecting this type of interaction between multivibrator 20 and oscillator 16. Temperature-responsive element 14, which is preferably a thermistor, is coupled into the RC timing circuit of multivibrator 20 to vary the ON time of the multivibrator 20 as a function of the temperature of temperature-responsive element 14. Since the resistance of a thermistor varies as a function of temperature, and since the ON time of a multivibrator is determined by the resistance of its RC timing circuit, this function can be achieved quite simply by connecting the thermistor 14 into the RC timing circuit of multivibrator 20 in accordance with well-known prior art principles.

To reduce the power requirements of oscillator 16, the ON time of multivibrator 20 is preferably only a fraction of the OFF time as illustrated in FIG. 6. This is achieved, as well known in the art, by using a faster RC timing circuit for the ON time than for the OFF time. With this circuit arrangement, oscillator 16 will be periodically activated for a time period which is proportional to the temperature of thermistor 14. FIG. 6 shows three illustrative output cycles $TD_1$, $TD_2$, and $TD_3$, which indicate a change in the temperature of thermistor 14. After being turned on at time $T_1$, the multivibrator 20 is turned off at a time $T_2$ which varies as the resistance of thermistor 14 varies, thereby producing an ON time which is proportional to the temperature of thermistor 14.

The telemetry system of this invention utilizes a plurality of such transducers, as illustrated by transducers 1, 2 and 3 in FIG. 2. In order to provide distinct, measurable signals, different frequencies are used for each transducer, although it should be noted that the same result can be achieved with a single transmission frequency by assigning a distinct pulse code to each transducer. When different frequencies are used, a multichannel receiver 26 is used to simultaneously receive the output signals of the transducers. The received signals are applied to a digital-to-analog converter 28 which converts the time duration signals into analog signal levels. These signals are analyzed in an output circuit 30 to produce indicator and control signals which may be used for measuring the temperature of any selected temperature-responsive element, for automatically controlling processing equipment in accordance with the temperatures of all of the temperature-responsive elements, and for actuating an alarm and indicator when any one of the temperature-responsive elements exceeds a predetermined maximum or minimum level. The detailed operation of output circuit 30 and control and alarm circuit 32 will be described later.

Figure 1:
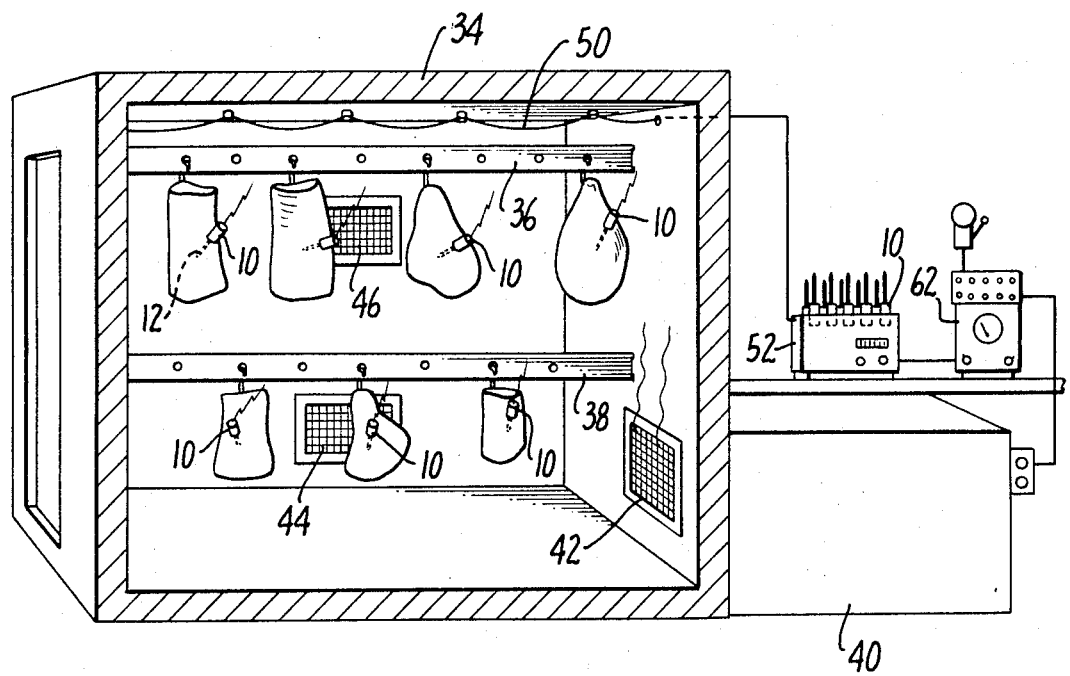
FIG. 1 is a perspective view of one illustrative smokehouse utilizing the temperature transducers and telemetry system of this invention.

FIG. 1 shows the application of the above-described transducer and telemetry system to the smoking of meat. A smokehouse chamber 34 is shown containing an upper rack 36 and a lower rack 38, each of which contains seven equal openings for receiving meat hooks for suspending pieces of meat to be smoked. A smoke furnace 40 adjacent to smokehouse chamber 34 introduces heat and smoke into chamber 34 through inlet registers 42 and 44 at the bottom of the chamber and an outlet register 46 is provided at the top of the chamber to remove the heat if necessary. Each piece of meat in the smokehouse has a temperature transducer inserted therein at a convenient point to monitor its internal temperature.

Figure 5:
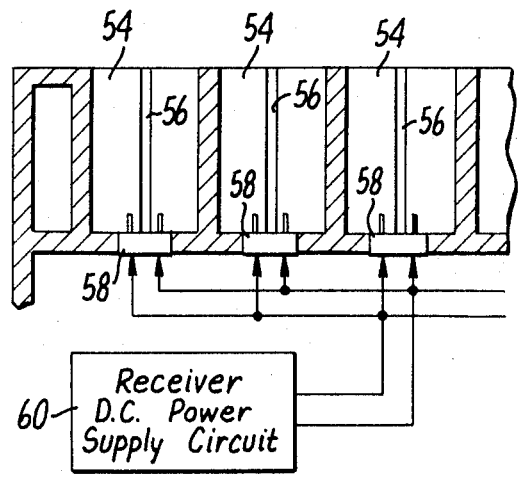
FIG. 5 is a cross-sectional view of one illustrative transducer storage and recharging unit for the transducer of this invention.

The output signals of the transducers are picked up by an antenna 50 which is coupled to a multichannel receiver 52 which contains a storage and recharging rack for the transducers on its upper surface as best illustrated in FIG. 5. The storage and recharging rack contains a plurality of receptacles 54 each containing a recessed longitudinal keyway 56 along one side and a DC power connector 58 on the bottom. Keyways 56 are oriented to engage the plungers of the switches 24 on the transducers so as to align the electrical connectors 22 of the transducers with the electrical connectors 58 of the receptacle and to open switch 24 of each transducer when it is inserted into a receptacle. The plunger of switch 24 is spring loaded outwardly to automatically close switch 24 when the transducer is removed from its storage and recharging receptacle for use. The recharging power for connectors 58 in the receptacles 54 is provided by a suitable low voltage output tap from the receiver DC power supply circuit 60.

Figure 4:
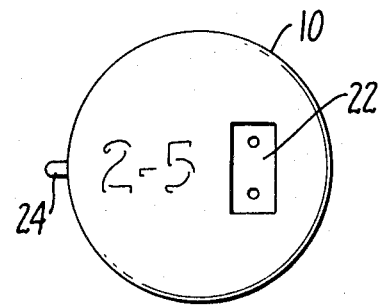
FIG. 4 is an end view of the transducer housing shown in FIG. 3 taken along the plane 4—4 of FIG. 3.
Figure 7:
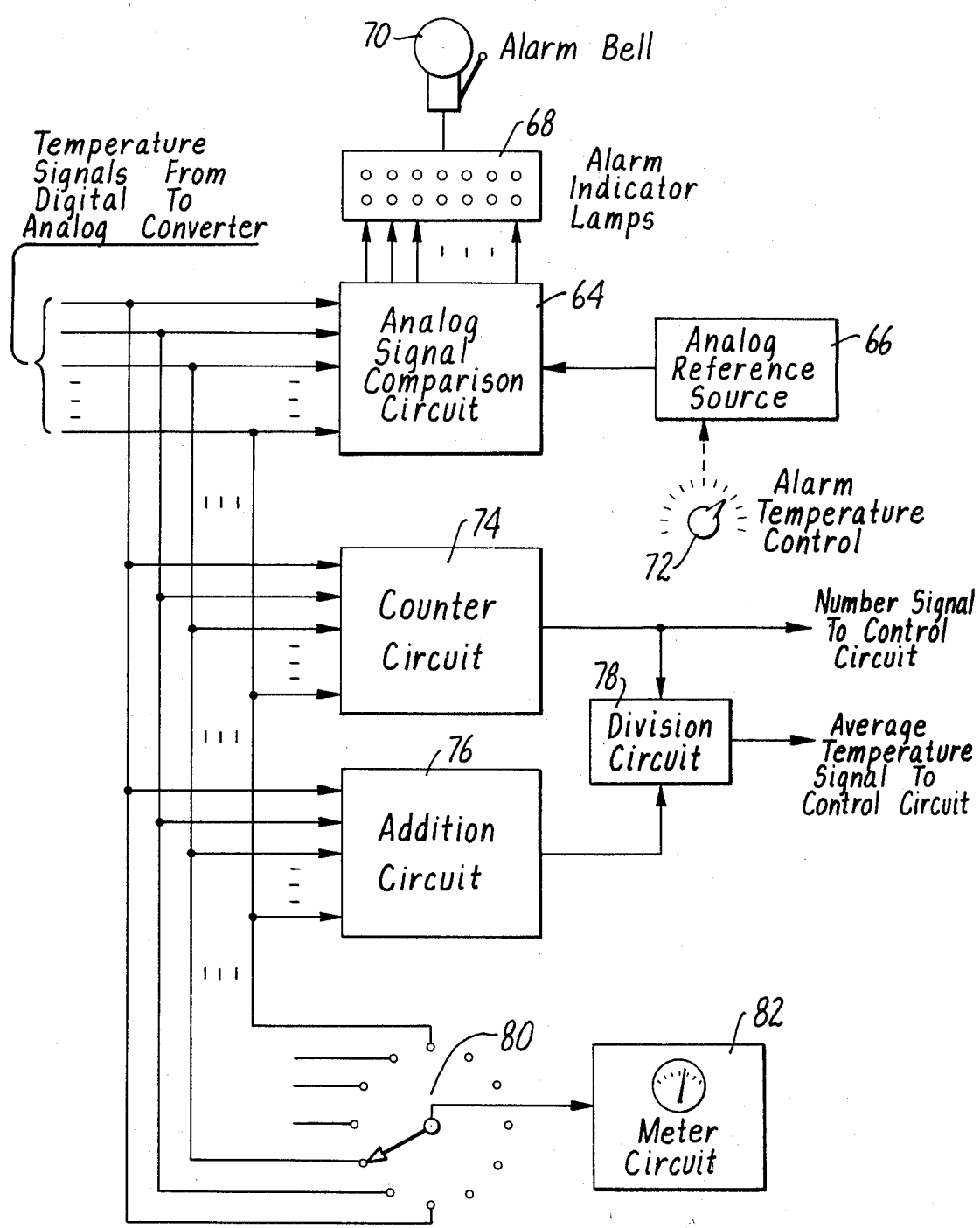
FIG. 7 is a block diagram of one illustrative output circuit for the telemetry system of this invention.

Receiver 52 contains a digital to analog converter for converting the received time duration signals into analog signal levels which are applied to an output unit 62 whose circuitry is illustrated in FIG. 7. Referring to FIG. 7, the individual analog signal levels are applied to an analog comparison circuit 64 which also receives an analog reference signal from reference source 66 indicating the maximum permissible inner temperature for the meat. When the maximum permissible temperature is exceeded by any one of the transducer signals, a signal is sent to a bank of alarm indicator lamps 68 to identify the transducer in question. For purposes of identification, each of the transducers is marked with a unique identifying mark, as illustrated in FIG. 4, and the alarm indicator lamps are correspondingly marked. When any one of the alarm indicator lamps is lighted, an alarm bell 70 is sounded to indicate that one or more pieces of meat have become overheated. The alarm indicator lamps, of course, remain lighted as long as the overheated condition remains, and the temperature at which the alarm indicator lamps and bell are activated can be set to any desired level by a manual alarm temperature control 72 which varies the output of analog reference source 66.

In order to properly control the heat input into the smokehouse, it is necessary to derive a signal which is proportional to the average temperature of the meat in the smokehouse and a signal which indicates the number of pieces therein. This is accomplished by a counter circuit 74, which counts the number of analog signal channels which are activated, an addition circuit 76, which adds all of the analog signals together, and a division circuit 78, which divides the total value of the analog signals by the number of analog signals present. With these signals, the smokehouse can be automatically controlled by means of well-known prior art control circuitry to establish and maintain the proper conditions for processing the meat therein.

In order to monitor the temperature of individual pieces of meat in the smokehouse, the analog signal levels are further connected to a rotary selector switch 80 which couples any selected signal channel to a meter circuit 82 which translates the selected analog signal into a visual indication on a meter calibrated in degrees.

In some cases, it may be desirable to have each individual transducer associated with a fixed location inside the smokehouse. This can be done by assigning the same set of identification members to the storage locations within the smokehouse as are assigned to the transducers. For example, the upper rack 36 of smokehouse 34 can be designated as rack No. 1 and the lower rack 38 as rack No. 2. The storage locations can then be identified by a pair of numbers, the first of which designates the rack number, and the second of which designates the location on that rack from left to right. Thus storage location 2—5 is the fifth location from the left on rack number 2. Associating each transducer with a specific location adds additional information to the transducer output signals, which in that case would also indicate the physical location of each temperature signal. This may be useful in applications of the invention where the physical distribution of temperatures is an important factor.

The transducer housing is preferably made of stainless steel, with the electronic components being potted inside the housing to provide an extremely rugged package. The battery is preferably a nickel cadmium battery, and the housing serves as an antenna for the oscillator unit.

Although specific embodiments of this invention have been disclosed by way of illustration, it should be understood that this invention is not limited to the disclosed embodiments but also includes all modifications falling within the scope of the following claims:

I claim:

1. A temperature transducer comprising a housing member, a relatively slender probe attached to said housing member and projecting therefrom, a temperature responsive element attached to said probe, an oscillator circuit within said housing member for generating and transmitting a uniform carrier wave, a battery within said housing member for activating said oscillator circuit, and a modulator circuit coupled between said temperature-responsive element of said oscillator circuit for controlling the output signal thereof in accordance with the temperature of said temperature-responsive element, said modulator circuit comprising a modulator switching circuit for periodically activating said oscillator circuit to transmit a uniform carrier wave for a time period which is proportional to the temperature of said temperature-responsive element.

2. A temperature transducer as defined in claim 1 wherein said modulator switching circuit comprises a multivibrator circuit coupled to said oscillator circuit for periodically activating the oscillator during one of the two multivibrator states and for periodically deactivating the oscillator during the other of the two multivibrator states, said temperature-responsive element being coupled to said multivibrator circuit for controlling the time duration of at least one of the two multivibrator states in accordance with the temperature of said temperature-responsive element.

3. A temperature transducer as defined in claim 2 and further comprising an electrical connector attached to said housing member for receiving electrical power input to recharge said battery, and switch means attached to said housing member for automatically deactivating said oscillator and multivibrator circuit when said battery is being recharged.

4. A temperature transducer as defined in claim 1 and further comprising an electrical connector attached to said housing member for receiving electrical power input to recharge said battery, and switch means attached to said housing member for automatically deactivating said oscillator and modulator switching circuit when said battery is being recharged.

5. A temperature telemetry system comprising a plurality of temperature transducers each including a temperature-responsive element, an oscillator circuit for generating and transmitting a uniform carrier wave, a battery for activating said oscillator circuit, and a modulation switching circuit coupled between said temperature responsive element and said oscillator circuit for periodically activating the oscillator circuit to transmit a uniform carrier wave for a time period which is proportional to the temperature of said temperature-responsive element; a receiver circuit for receiving the output signals of said oscillator circuits; and an output circuit coupled to the output of said receiver circuit for producing signals relating to the temperatures of the temperature-responsive elements in said plurality of temperature transducers.

6. A temperature telemetry system as defined in claim 5 wherein each of said temperature transducers includes a housing member, an electrical connector attached to said housing member for receiving electrical power input to recharge said battery, and switch means attached to said housing member for automatically deactivating said oscillator and modulator switching circuits when said battery is being recharged, and further comprising a transducer storage unit containing a plurality of receptacles for receiving and storing said plurality of transducers, and electrical connector means in each of said receptacles for applying power to the corresponding transducer to recharge the battery thereof.

7. A temperature telemetry system as defined in claim 5 and further comprising a digital to analog converter circuit coupled between said receiver circuit and said output circuit for converting the time duration signals from said oscillator circuits into analog signal levels.

8. A temperature telemetry system as defined in claim 7 wherein each of said oscillators transmits a different frequency when activated, and wherein said receiver circuit contains a multiple channel input for simultaneously receiving the output signals of all of said oscillators on different channels.

9. A temperature telemetry system as defined in claim 7 wherein said output circuit contains a comparison circuit coupled to the output of said digital to analog converter circuit for comparing said analog signal levels to predetermined signal levels and for producing signals as a function of the difference between said analog signal levels and said predetermined signal levels.

10. A temperature telemetry system as defined in claim 9 wherein each of said transducers includes a housing member, a relatively slender probe attached to said housing member for insertion into food products, each of said temperature-responsive elements being attached to the corresponding probe, and wherein said predetermined signal levels are proportional to temperature levels relating to the processing of said food products.

11. A temperature telemetry system as defined in claim 7 wherein said output circuit includes a meter for indicating the numerical value of said analog signal levels and switch means for selectively coupling each of said analog signals to said meter to provide a visual indication of the temperature of the corresponding temperature-responsive elements.

12. A temperature telemetry system as defined in claim 11 wherein said output circuit includes means for producing an alarm signal when the difference between any one of said analog signal levels and a predetermined signal level exceeds a predetermined value.

13. A temperature telemetry system as defined in claim 11 wherein each of said transducers has a visible mark on the exterior thereof for uniquely identifying the transducer.

14. A temperature telemetry system as defined in claim 13 and further comprising a food processing chamber having a plurality of spatially separated areas for receiving food products to be processed, each of said spatially separated areas having a visible mark corresponding to the mark on the exterior of one and only one of said transducers.